United States Patent [19]

DeHoff

[11] 4,149,211

[45] Apr. 10, 1979

[54] LINE SURGE PROTECTION DEVICE FOR TELEPHONE SYSTEM

[75] Inventor: Harold P. DeHoff, Council Grove, Kans.

[73] Assignee: Monarch Molding, Council Grove, Kans.

[21] Appl. No.: 842,893

[22] Filed: Oct. 17, 1977

[51] Int. Cl.² ............................................... H02H 1/04

[52] U.S. Cl. ..................................... 361/119; 179/96; 337/34; 339/198 GA; 361/124

[58] Field of Search ............... 361/117, 118, 119, 120, 361/124, 426, 428; 337/15, 28, 29, 31, 32, 33, 34; 339/14 P, 19, 111, 166 R, 198 GA, 198 H, 198 P, 198 N, 214 S; 179/96-99

[56] References Cited

U.S. PATENT DOCUMENTS

| | | | |
|---|---|---|---|
| 1,551,700 | 9/1925 | Sands | 337/29 |
| 2,104,434 | 1/1938 | McCormick et al. | 179/96 |
| 3,255,330 | 6/1966 | MacKenzie et al. | 337/32 |
| 3,411,040 | 11/1968 | Dietz | 361/119 |
| 3,535,463 | 10/1970 | Trucco | 339/198 GA X |
| 3,760,328 | 9/1973 | Georgopulos | 361/428 X |

*Primary Examiner*—Patrick R. Salce

*Attorney, Agent, or Firm*—Burns, Doane, Swecker & Mathis

[57] ABSTRACT

A unitary line surge protector for removable connection to an individual, existing type-444 connecting block and jack assembly of a main distribution frame of a telephone exchange system at a telephone office or substation. Each connecting block and jack assembly includes a pair of normally closed jacks interposed between connecting lugs and a guide extension running generally parallel to the jacks. The line surge protector includes generally flat housing of electrically insulative material containing a pair of line surge protection devices. The housing has apertures that receive the jacks of the assembly, and interior contacts open the jacks and connect them through the protection devices. The dimensions of the housing are such that the protectors can be mounted adjacent one another both vertically and horizontally on a type-444 frame. An electrically conductive guide engaging member disposed in said one aperture electrically contacts the guide extension for guiding the protector onto the jacks and for providing a ground for the assembly.

4 Claims, 4 Drawing Figures

FIG. 1
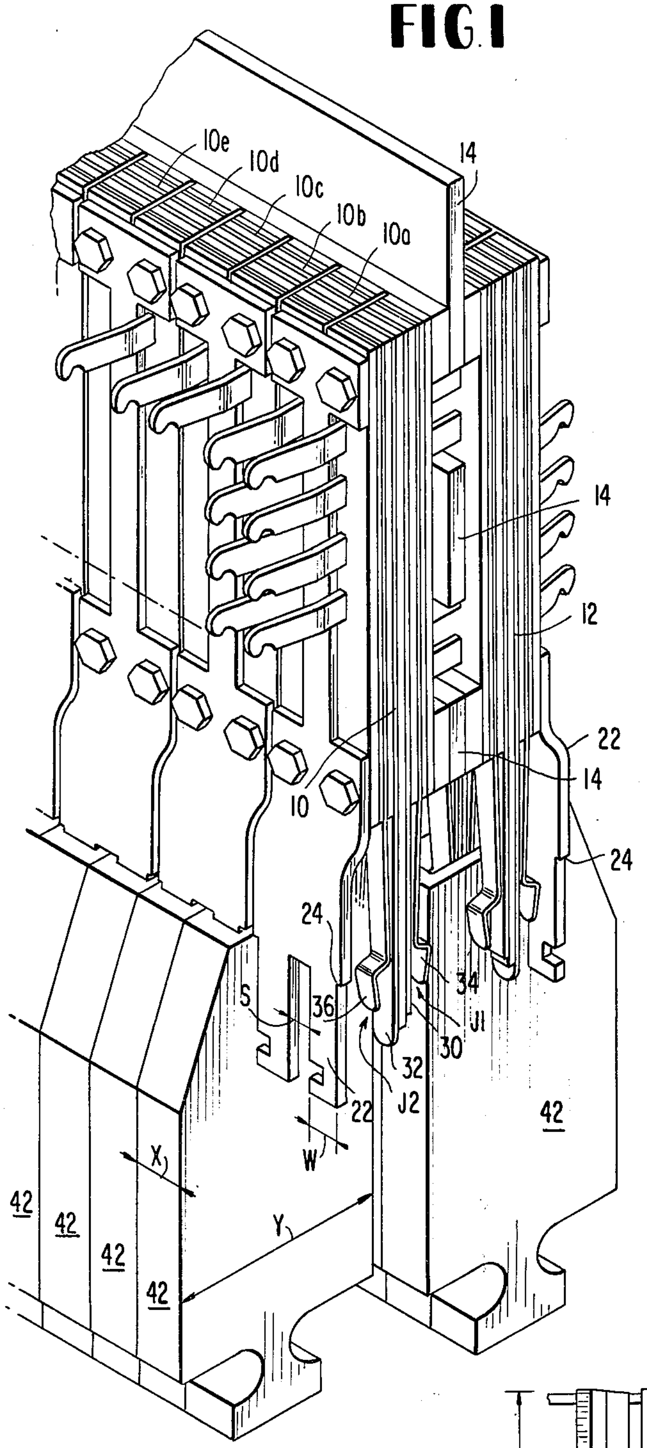
FIG. 2
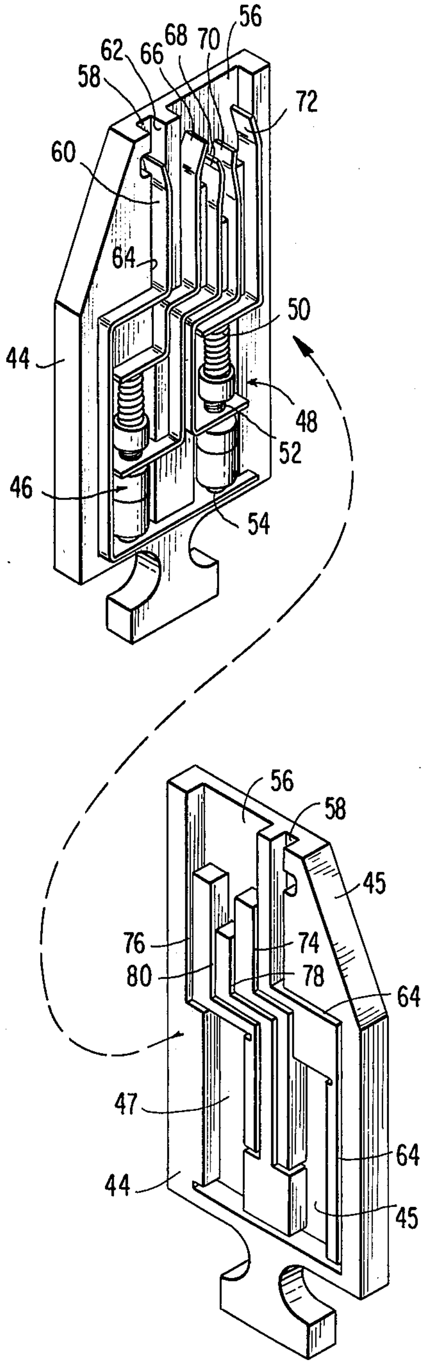
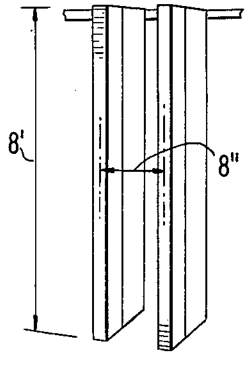
FIG. 1A

LINE SURGE PROTECTION DEVICE FOR TELEPHONE SYSTEM

BACKGROUND OF THE INVENTION

The present invention relates to line surge protection for telephone equipment and, more particularly, to a unitary line surge protector for removable connection to an existing block and jack assembly of a main distribution frame of a telephone exchange system to protect telephone equipment from line surges on any individual telephone lines.

Telephone lines coming into a telephone office are typically terminated on a main distribution frame and are extended from the frame to the telephone office equipment. The lines are terminated on block and jack assemblies which provide connecting terminals as well as test jacks on the main distribution frame.

One block and jack assembly commonly used to connect incoming lines to telephone office equipment is referred to as the 444-type connector. This type of block and jack assembly is designed to handle the interconnection of two sets of two-wire pair lines with provision for the line current to pass through normally closed jacks that may be opened for test purposes. A mounting plate attached to the main distribution frame supports a large number of the 444-type assemblies in stacked relation.

The use of this simplified 444-type block and jack assembly was instituted as a space and cost saving measure when it was found that both protector blocks and heat coils could be eliminated at the main distribution frame. As a result, the telephone office may employ countless 444-type block and jack assemblies stacked in close proximity without any form of fault protection. It has been found, however, that with increased telephone system complexity and more diversified use, there exists a need to provide line surge protection at the main distribution frame in order to protect the telephone office equipment from overcurrent and/or overvoltage conditions (e.g. lightning) that might not otherwise be dissipated in the system. This is made difficult, of course, in the case of the main distribution frame using the 444-type block and jack assembly since one of the design criteria for this assembly was that protection of this type was not needed. Accordingly, the tightly packed terminal blocks and test jacks mitigate against an easy solution to the problem of protection at the main distribution frame.

Accordingly, it is an object of the present invention to provide a novel line surge protector for 444-type block and jack assemblies mounted in stacked relation on a main telephone distribution frame wherein the protector is a simple, unitary device that can be removably mounted on an individual block and jack assembly without unduly interfering with access to the connecting terminals of the assemblies.

It is a further object of the present invention to provide a simple, unitary line surge protector for connection to individual 444-type block and jack assemblies mounted in stacked relation on a main telephone distribution frame wherein the protector includes an insulative housing having no protruding electrical contacts.

It is another object of the present invention to accomplish the foregoing objects through the use of conventional molding techniques in the manufacture of the protector.

These and other objects and advantages of the present invention are accomplished through the provision of a unitary line surge protector that connects to an individual, existing 444-type block and jack assembly of a main distribution frame having multiple block and jack assemblies mounted in stacked relation on a mounting plate. The 444-type block and jack assembly includes four generally parallel connector strips and an outside clamping strip all separated from each other and the mounting plate by interposed insulating strips. The two interior connector strips and their interposed insulating strip extend outwardly beyond the mounting plate in a first direction to form first and second jack connectors. The two outside connector strips have spring extensions that also extend outwardly beyond the mounting plate in the first direction and are biased into contact with the respective first and second jack connectors to thereby form a pair of normally closed jacks. The outside clamping strip also extends outwardly along side the jacks to form a guide extension having a shoulder stop intermediate its ends.

Each of the connector strips has a right angle extension serving as a connecting lug for connection of telephone lines thereto. The connecting lugs are arranged in two wire pairs with current paths between the pairs of connecting lugs passing through the pair of normally closed jacks. The pair of normally closed jacks and guide extension are approximately equal in width in the stacking direction, and are spaced from the pair of jacks and guide extension of an immediately adjacent jack and block assembly in a stack of such assemblies by a predetermined fixed spacing.

The preferred line surge protector cooperates with an individual 444-type jack and block assembly through the provision of a flat housing of electrically insulative material having a front edge with an edge thickness greater than the width of one pair of normally closed jacks but no greater than the sum of the width of one pair of the jacks plus the fixed spacing between jacks of adjacent assemblies. The front edge of the housing is provided with apertures to receive the pair of jacks and the guide extension of one assembly.

An electrically conductive guide engaging member is disposed in the aperture receiving the guide extension. The guide engaging member is a flat strip of metal that contacts the guide extension and spring biases it into contact with an interior surface of the aperture so as to simultaneously provide an electrical contact and a force fit for the guide extension when it is inserted into the aperture. In the aperture receiving the pair of normally closed jacks there are disposed first and second pairs of electrically conductive jack engaging members. The jack engaging members are flat strips of metal that are configured to contact the jacks and spring bias the jacks into an open position.

A pair of line surge protection devices is disposed in electrically isolated cavities within the flat housing. Each protection device includes two line terminals and a ground terminal. Each pair of jack engaging members extends through electrically isolated slots in the housing into electrical contact with the respective line terminals of an associated one of the protection devices. The guide engaging member extends through an electrically isolated slot in the housing into contact with the ground terminal of each of the protection devices.

When the housing is connected to a block and jack assembly, the normally closed jacks are received in the one aperture and are opened by the engaging members in the aperture. The current path between the connecting lugs of the block and jack assembly is thereby opened and current is diverted through the jack engaging members and the protection devices in the housing. The housing is sized so that it can be connected to one block and jack assembly without interfering with access to an immediately adjacent assembly. In addition, the housing is shaped to allow access to the connecting lugs of the block and jack assemblies for soldering or the like.

The foregoing and other advantages and features of the present invention will be more fully appreciated by one skilled in the art to which the invention pertains from the following detailed description when read in conjunction with the drawings.

BRIEF DESCRIPTION OF THE DRAWINGS

FIG. 1 is a perspective view of stacked pairs of 444-type block and jack assemblies arranged for mounting on a main distribution frame and having protectors according to the present invention mounted thereon;

FIG. 1A is a schematic representation of a main distribution frame of a telephone system showing the multiple stacks or rows of 444-type block and jack assemblies as they might be arranged in a telephone system office;

FIG. 2 is an exploded, perspective view of a preferred embodiment of the protector of the present invention.

DETAILED DESCRIPTION

Figure 3:
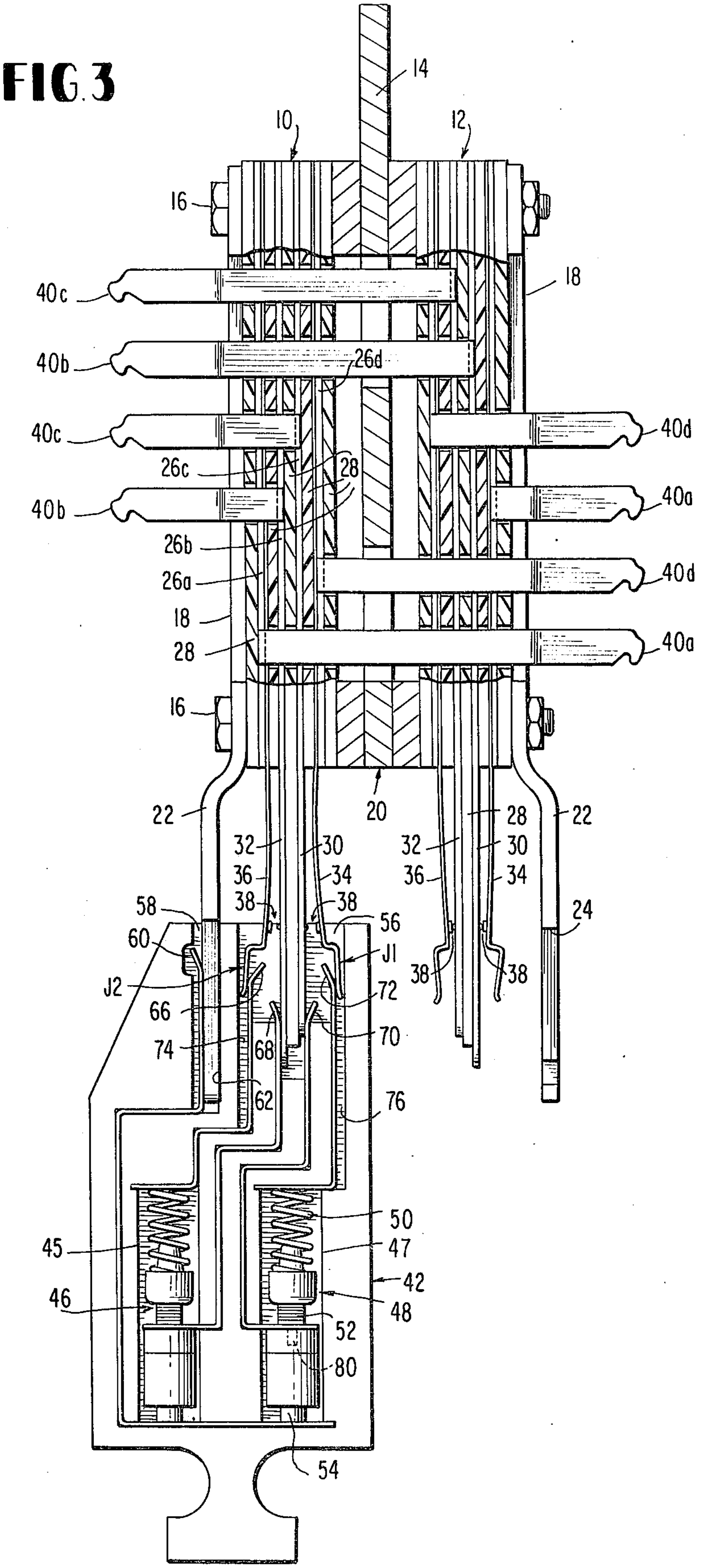
FIG. 3 is a plan view in partial cross section illustrating the preferred embodiment of the protector of the present invention mounted on a 444-type block and jack assembly.

FIGS. 1 and 3 illustrates a typical connecting block and jack assembly of the 444-type that is used on a main distribution frame of a telephone exchange system at the telephone office. Each telephone line entering or exiting the telephone office is terminated on a block and jack assembly and appropriate connections are made to the telephone office equipment from the block and jack assemblies. As will be seen hereinafter, each telephone line connection to the office equipment can be opened at the block and jack assembly for test purposes.

As can be seen in FIGS. 1 and 3, the block and jack assemblies are arranged side-by-side in pairs as is generally indicated at 10 and 12. The jack and block assemblies are mounted in stacked relation on a mounting plate 14 that extends between adjacent pairs of the assemblies so that the tightly stacked block and jack assemblies 10, 10*a*, 10*b*, 10*c*, etc. may be arranged in vertical rows on the main distribution frame.

As can be seen most readily in FIG. 3, the adjacent pairs of block and jack assemblies 10 and 12 are secured to the mounting plate 14 by bolts 16 that extend through an outside clamping strip 18 provided on the outside of each block and jack assembly. The clamping strip 18 extends outwardly beyond one edge 20 of the mounting plate 14 to form a guide extension 22 having a shoulder 24 that acts as an abutment stop for test jacks or the like.

Each block and jack assembly includes four generally parallel connector strips 26*a*, 26*b*, 26*c* and 26*d*. The connector strips and the outside clamping strips 18 are separated from each other and from the mounting plate 14 by insulating strips 28, thereby forming a sandwiched configuration. The two innermost of interior connecting strips 26*b* and 26*c* extend outwardly beyond the edge 20 of the mounting plate 14 to form two jack connectors 30 and 32. The two exterior or outside connecting strips 26*a* and 26*d* have spring extensions 34 and 36 that extend outwardly beyond the edge 20 of the mounting plate and are generally parallel to and coextensive with the jack connectors 30 and 32. The spring extension 34 is spring biased into contact with the jack connector 30 and the spring extension 36 is spring biased into contact with the jack connector 32. Contact points 38 may be provided on the jack connectors and spring extensions where they contact in order to reduce contact wear and resistance at the points of engagement.

The spring extensions 34 and 36 and the jack connectors 30 and 32 form a pair of normally closed jacks J1 and J2 (i.e. normally closed switch contacts that can be mechanically engaged to open the circuit therethrough). These normally closed jacks extend generally parallel to the guide extension 32 and control the continuity of the current path between adjacent sets of the connector strips 26*a*, *b*, *c*, and *d*. Thus, for example, a current path is provided between the connector strips 26*a* and 26*b* through the normally closed jack formed by the members 32 and 36. Similarly, a current path is provided between connector strips 26*c* and 26*d* through the jack formed by members 30 and 34.

Each of the connector strips 26*a*, *b*, *c*, and *d* includes a right angle extension that forms a connecting lug. The outside connector strips 26*a* and 26*d* have right angle extensions 40*a* and 40*d*, respectively, extending perpendicular to the connecting strips in one direction. The interior connector strips 26*b* and 26*c* have right angle extensions 40*b* and 40*c*, respectively, extending perpendicular to the connector strips in the direction opposite the extensions 40*a* and 40*d*. The right angle extensions 40*a*–40*d* thereby form two-wire pairs of connecting lugs on opposite sides of the block and jack assembly so that a two-wire telephone line can be connected through the block and jack assembly with the current path for the line passing through the normally closed jacks. With the block and jack assemblies connected to the mounting plate 14 in pairs as is normally the case, two of the two-wire pairs of telephone lines can be terminated on one side of the pair of assemblies 10 and 12 (e.g. at the connecting lugs 40*b* and 40*c*) and can be connected through the assemblies 10 and 12 to telephone office equipment (e.g. at the lugs 40*a* and 40*d*).

It will be appreciated from FIGS. 1 and 3 that the edges of the guide extension 22 and the normally closed jacks J1 and J2 are substantially coplanar and that the width W of the guide extension 22 is therefore approximately equal to the width of the jacks. The assemblies are stacked vertically as shown in FIG. 1A in stacks or rows that may extend from floor to ceiling height. There is a minimal spacing S (FIG. 1) between adjacent stacked assemblies in the direction of stacking (i.e. in the vertical direction in the illustrated embodiment). Moreover, it can be seen from FIG. 1A that the assemblies are mounted on the main distribution frame such that the spacing between adjacent stacks of assemblies is just sufficient to provide room to make connections to the connecting lugs 40*a*–40*d* (e.g. about 8 inches).

Despite this lack of space in the vicinity of 444-type block and jack assemblies, the present invention provides line surge protection for existing telephone lines connected to main distribution frames having 444-type assemblies through the provision of individual, removable, unitary protector devices 42 that minimally obstruct access to the assemblies.

With reference now to FIGS. 2 and 3, the preferred embodiment of the protector device 42 of the present invention includes a flat housing 44 of electrically insulative material such as a moldable plastic. The protector is a one piece or unitary unit in its assembled form but may be made from several individual pieces as will be seen hereinafter. The edge width X of the unitary protector assembly is slightly greater than the width W of the jacks and the guide extension so that the assembly can accomodate the insertion of these members. However, the width X of the assembly is no greater than, and preferably slightly less than the sum of the width W and the spacing S so that the protectors can be mounted on stacked block and jack assemblies as shown in FIG. 1. Moreover, the horizontal dimension Y of the housing is preferably minimal, as shown, and the housing 44 is preferably shaped with a bevel 45 or the like to minimize any possible obstruction of the lug connectors 40*a*–40*d* of the block and jack assembly.

The housing 44 is preferably made in two flat pieces that each contain matching, side-by-side cavities 45 and 46 of approximately equal depth to receive conventional line surge protectors 46 and 48. The line surge protectors 46 and 48 may be identical and may be, for example, protectors of the type shown in U.S. Pat. Nos. 3,947,730 or 4,004,263. Such protectors normally provide a current path between contact points 50 and 52 until a current or large voltage surge occurs (e.g. the line connected through contacts 50 and 52 is struck by lightning). When the surge occurs, a solder connection in the vicinity of contact point 52 melts and causes electrical contact between the contact point 52 and a ground contact 54. The voltage or current surge is thereafter shorted from the contact point 52 to the ground contact 54.

The housing 44 is formed with apertures 56 and 58 in one edge thereof to receive the jacks J1 and J2 and the guide extension 22, respectively. Specifically, the protector device 42 slides onto the jacks and guide extension as illustrated in FIGS. 1 and 3 with the pair of jacks received in the aperture 56 and the guide extension 22 received in the aperture 58. Within the aperture 58, a spring member 60 engages the guide extension 22. This member 60 spring biases the guide extension into sliding contact with at least one interior surface 62 of the aperture 58, thereby causing frictional engagement between the housing and the guide extension. This prevents inadvertent removal of the protector device from the block and jack assembly and also provides accurate guiding of the device onto the assembly.

Moreover, the spring member 60 electrically contacts the guide extension 22 and the member extends through 54 of the protectors 46 and 48. Since the spring member 60 is preferably an electrically conductive metal strip, the ground contacts of the protectors 46 and 48 are electrically connected to the guide extension 22 when the protector device 42 is placed on the block and jack assembly.

The aperture 56 contains four electrically conductive contacts 66, 68, 70 and 72 that cooperate with the jacks J1 and J2 when the protector device is placed on the assembly. The contacts 66 and 72 are shaped to engage the spring extensions 36 and 34, respectively, of the jacks J2 and J1. Upon engaging the spring extensions 36 and 34, the contacts 66 and 72 force these spring extensions away from the strips 30 and 32 so that the contacts 38 of the jacks J1 and J2 are moved into their open positions as shown in FIG. 3.

Also, the contacts 68 and 70 electrically engage the respective strips 32 and 30. Extensions of the contacts 66 and 72 pass through slots 74 and 76 in the housing 44 and electrically contact the contact points 50 of the protectors 56 and 48. Similarly, extensions of the contacts 68 and 70 pass through slots 78 and 80 in the housing 44 and electrically contact the contact points 52 of the protectors 46 and 48.

It will be appreciated from the foregoing that the protector device 44, when placed on a jack assembly as shown in FIGS. 1 and 3, opens the assembly and provides a current path through the line surge protectors 46 and 48 rather than through the jacks. Specifically, the contact 72 engages the spring extension 34, forcing it out of contact with the strip 30. The current path from connector lug 40*c* to connector 40*d* is therefore through the strip 30, the contact 70, the contact point 52, through the upper half of the protector 48 to the contact 50, the contact 72 and the spring extension 34. Accordingly, all line current through the line connected to the lug connector 40*c* passes through the portion of the protector 48 between the contacts 50 and 52.

The current flow between lug connectors 40*a* and 40*b* is identical except that the current flows through the line surge, protector 46 rather than protector 48. Thus, it can be seen that each of the telephone lines entering and exiting the telephone office has a line surge protector in series therewith if one of the protector devices 42 is in place on each block and jack assembly. Thus, any line surges occurring outside the telephone office will be felt by the line surge protectors before reaching the telephone office equipment, thereby effectively isolating this equipment from potentially harmful surges such as those caused by lightning.

The effective isolation occurs as follows with the device as shown in FIGS. 1–3. A current surge on a line that is not protected by one of the protector devices 42 would ordinarily pass through the normally closed contacts 38 of the jacks J1 and J2. With the protector device in place, the current surge passes through one of the line surge protectors 46 and 48, causing a rapid heating of a solder joint in the vicinity of contact point 52. The solder joints melts, releasing a contact illustrated in phantom at 80. This contact 80 moves into electrical engagement with a carbon electrode that forms part of the ground contact 54. A current path is thus established between the contacts 50 and 52 and the ground contact 54. Since the ground contact 54 is electrically connected to the guide extension 22 through the contact 60, and since the guide extension 22 is grounded by way of the mounting plate 14 and the main frame, the contacts 50 and 52 (and the lines connected thereto) are grounded. Thus, a surge in a telephone line is effectively shunted to ground before it can damage the telephone equipment at the telephone office.

The presently disclosed embodiment is therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A unitary line surge protector for removable connection to an individual, existing connecting block and jack assembly of a main distribution frame of a telephone exchange system at a telephone office or substation in which connecting block and jack assemblies are mounted in stacked relation on a mounting plate attached to the main distribution frame and in which each connecting block and jack assembly includes four generally parallel connector strips and an outside clamping strip all connected to the mounting plate and separated from each other and from the mounting plate by insulating strips interposed therebetween in a sandwiched configuration, the two interior connector stips and their insulating strip extending outwardly beyond the mounting plate in a first direction to form first and second jack connectors, the two outside connector strips including spring extensions that extend outwardly beyond the mounting plate in said first direction and are each spring biased into contact with the adjacent one of the first and second jack connectors to thereby form, in conjunction with the first and second jack connectors, a pair of normally closed jacks, the outside clamping strip being at ground potential and extending outwardly beyond the mounting plate in said first direction to form a guide extension running generally parallel to the spring extension of the adjacent one of the outside connector strips, the guide extension also being at ground potential and having a shoulder stop intermediate the ends of the guide extension, each of the generally parallel connector strips also including a right angle extensions forming two-wire pairs of connecting lugs with current paths between each of the pairs of connecting lugs passing through an associated one of the pair of normally closed jacks, the pair of normally closed jacks and the guide extension having substantially coplanar edges and having approximately equal widths in the direction of stacking of the block and jack assemblies on the mounting plate, a pair of normally closed jacks and guide extension of a first jack and block assembly having a predetermined fixed spacing in the stacking direction relative to a pair of normally closed jacks and a guide extension of a second jack and block assembly mounted adjacent the first assembly in stacked relation on the mounting plate, the line surge protector comprising:

a generally flat housing of electrically insulative material having a front edge with an edge width greater than the width of one pair of normally closed jacks, the edge width being no greater than the sum of the width of said one pair of normally closed jacks plus said fixed spacing, the housing having a width measured in a direction parallel to the front edge and perpendicular to the direction of measurement of the front edge width of the housing that exceeds the distance between the normally closed jacks and the guide extension in the common plane thereof, the front edge of the housing having apertures extending into the housing, one aperture being configured to receive the guide extension and another aperture being configured to receive the one pair of normally closed jacks;

an electrically conductive guide engaging member disposed in said one aperture to electrically contact the guide extension and spring bias the guide extension into sliding engagement with at least one interior surface of the aperture;

first and second pairs of electrically conductive jack engaging members each disposed in said another aperture to electrically contact an associated pair of said jacks and spring bias said jacks into an open position; and a pair of line surge protection devices each disposed in a cavity in the housing, each protection device including first and second line terminals and a ground terminal, each pair of electrically conductive jack engaging members extending through electrically isolated passages in the housing into contact with the respective line terminals of an associated one of the protection devices, the electrically conductive guide extension engaging member extending through an electrically isolated passage in the housing into electrical contact with the ground terminal of each of said protection devices; whereby each of the pair of jacks of one block and jack assembly is opened with said housing receiving said guide extension and jacks, and a current path is provided between the pairs of connecting lugs through the jack engaging members and the protection devices.

2. The line surge protector of claim 1 wherein said guide extension receiving aperture is shaped to receive said guide extension and to abut said shoulder stop in order to limit the depth of insertion of said guide extension and jacks into said housing.

3. The line surge protector of claim 1 wherein the jack engaging and guide engaging members are flat strips of metal disposed in slots in the housing.

4. The line surge protector of claim 1 wherein the housing is a two piece member with electrically isolated, molded cavities for the pair of line surge protection devices.

* * * * *